(No Model.) 2 Sheets—Sheet 1.
R. L. JOHANSEN.
OCEAN POWER.
No. 508,320. Patented Nov. 7, 1893.
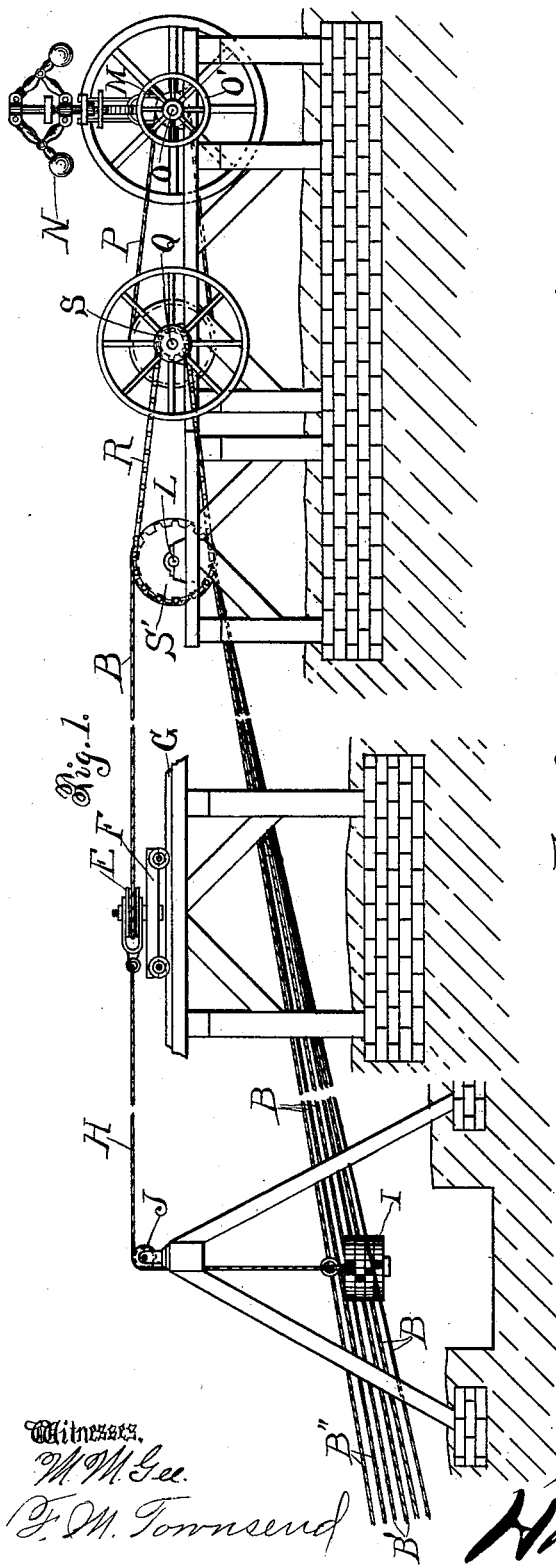
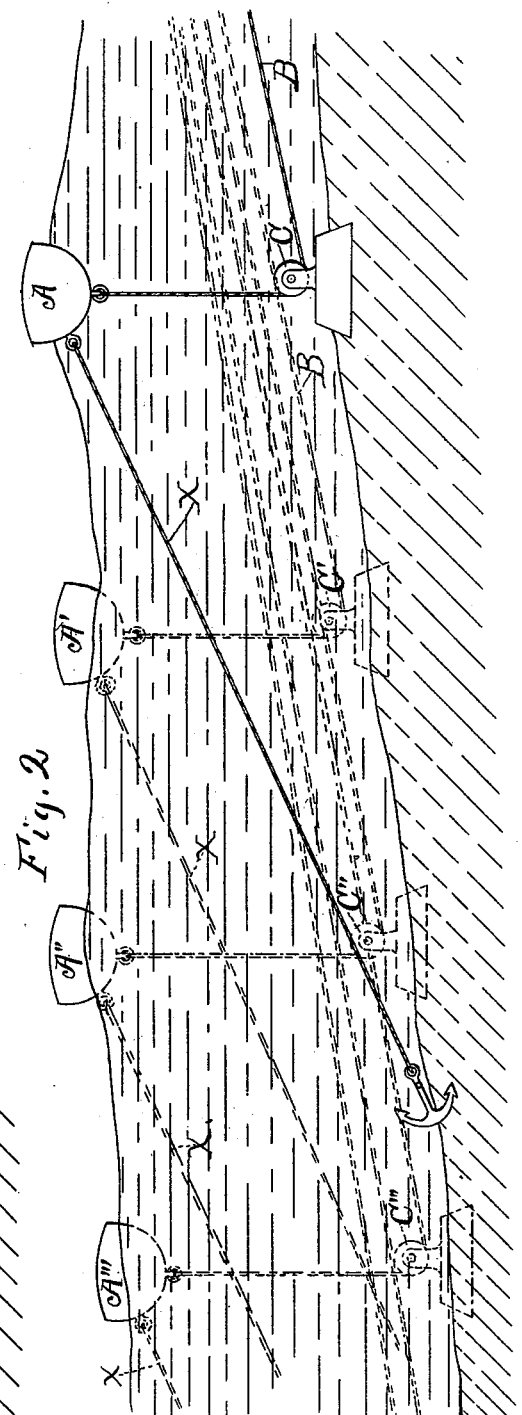

(No Model.) 2 Sheets—Sheet 2.
R. L. JOHANSEN.
OCEAN POWER.
No. 508,320. Patented Nov. 7, 1893.
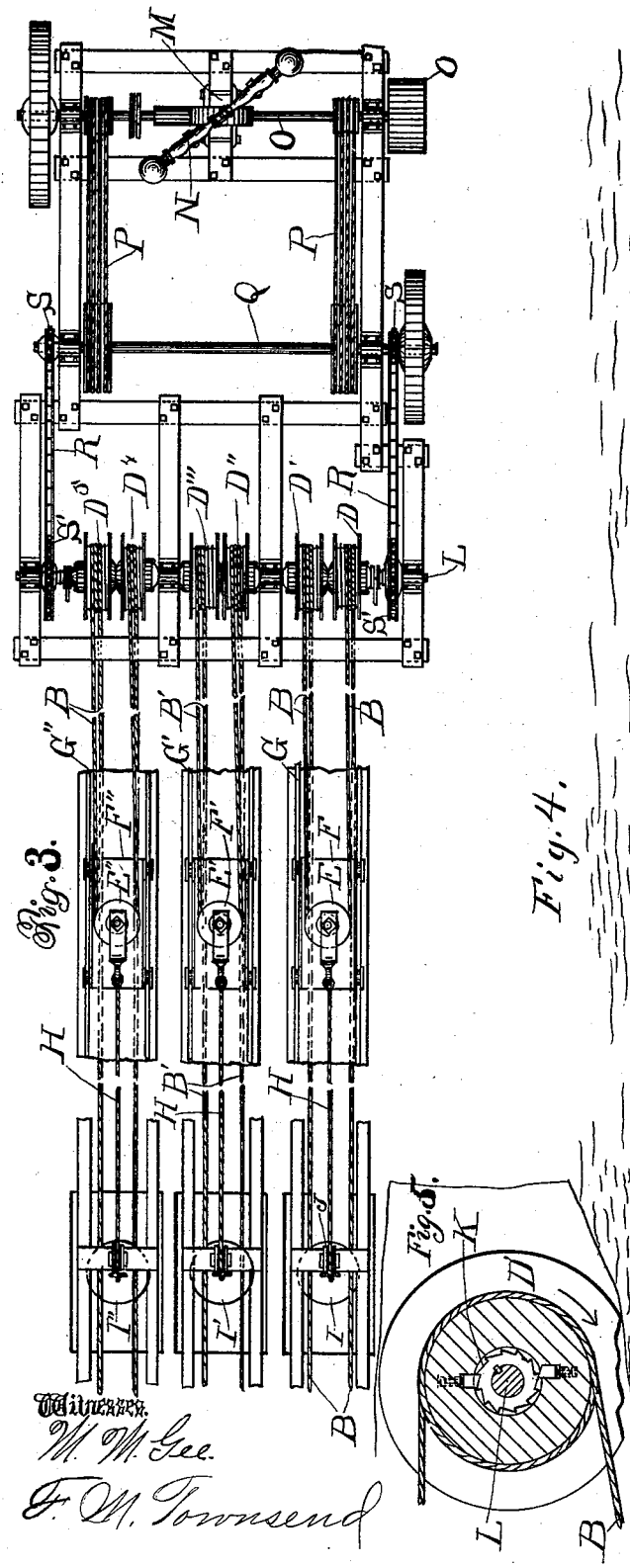
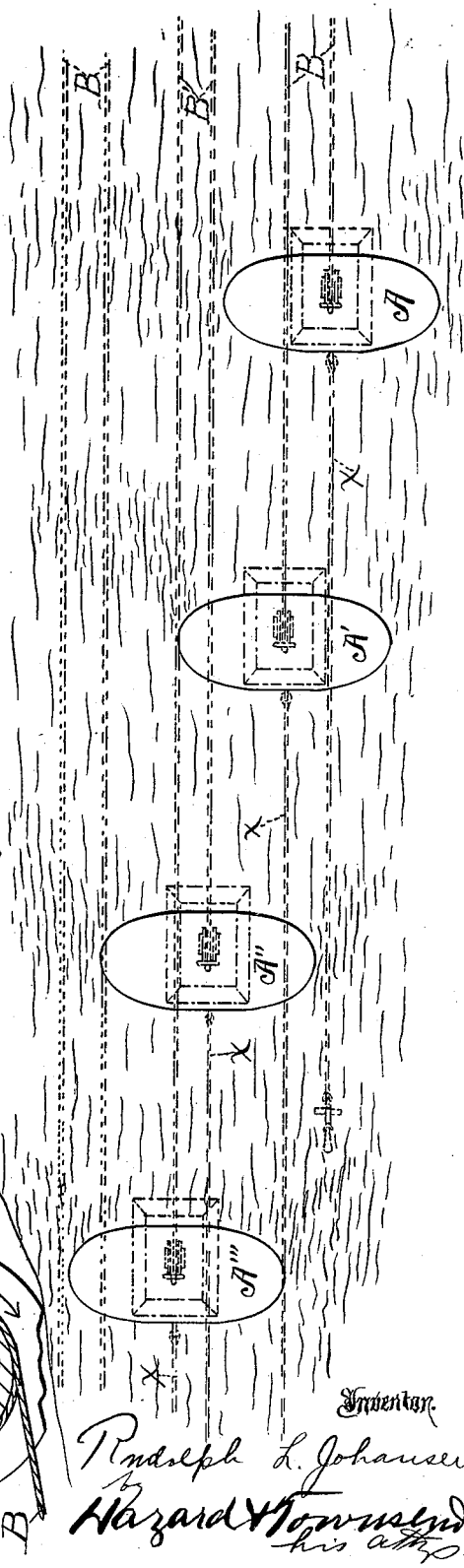

UNITED STATES PATENT OFFICE.

RUDOLPH L. JOHANSEN, OF LOS ANGELES, CALIFORNIA, ASSIGNOR OF ONE-HALF TO FRED R. PITTMAN, OF SAME PLACE.

OCEAN-POWER.

SPECIFICATION forming part of Letters Patent No. 508,320, dated November 7, 1893.

Application filed January 26, 1893. Serial No. 459,766. (No model.)

*To all whom it may concern:*

Be it known that I, RUDOLPH L. JOHANSEN, a citizen of the United States, residing at Los Angeles, in the county of Los Angeles and State of California, have invented a new and useful Improvement in Ocean-Power, of which the following is a specification.

My present invention is an improvement upon the invention shown in Letters Patent of the United States No. 475,450, granted to me May 24, 1892.

The object of my invention is to secure increased efficiency by so constructing the mechanism that every rising or forward movement of the float will operate to drive the machinery; also to provide more efficient means for securing steady motion of the machinery; also to more effectually avoid severe strain upon the machinery which might be caused by high waves or swells.

My invention is designed to be operated by a series of floats acted upon by the swell of the ocean and in practice it may be operated by any desirable number of floats anchored in series arranged horizontal, oblique or perpendicular to the shore as may be found most desirable. I prefer ordinarily to arrange the floats oblique to the shore as this gives proper clearance to the cable but no claim is made to any particular form of arrangement.

A further object of my invention is to fully avoid the necessity of large unmanageable floats by making the machinery more responsive to the action of the floats so that small floats can be used thereby avoiding the liability of the floats breaking away from their moorings.

In the drawings, Figure 1 is a fragmentary side elevation of my improved ocean power. Fig. 2 is a view showing the floats, &c., in the ocean. This view is a continuation of Fig. 1. Fig. 3 is a fragmentary plan view of the apparatus. Fig. 4 is a continuation of Fig. 3 oceanward. Fig. 5 is a section of the ratchet friction drum.

As illustrated in the drawings my present invention comprises the combination of two wave actuated floats; two retaining pulleys arranged to retain cables leading from such floats; a power shaft; two ratchet friction drums mounted upon such shaft both arranged to rotate freely thereon in one direction and to rotate the shaft in the other direction; a tension pulley; yielding means arranged to draw the tension pulley away from the shaft and a driving or power transmitting cable arranged with its intermediate portion rove through the tension pulley, and the two members thereof wound respectively around the two ratchet drums and led thence and rove through the retaining pulleys respectively, and led thence to their respective floats and secured to such floats. It also comprises the combination with such mechanism and power shaft of a governor and brake connected with such power shaft immediately or by intermediate means, and arranged to be operated by excessive speed of the shaft to restrain the rotation of the shaft so that the cables will slip upon the drums and allow the speed to become reduced. The governor and friction brake which I use for this purpose is the same as that shown and described in my said former Letters Patent and is therefore not shown in detail in this application, but the combination of the same with the mechanism hereinbefore specified is superior to that before shown in that by the present arrangement of the cable and tension devices the brake and tension devices co-operate more fully to relieve the machinery from excessive strain.

In the drawings A A' (A" A''') indicate the two wave actuated floats connected with each other by the cable B (B') which in its intermediate portion between such floats passes from the floats respectively to the retaining pulleys C C' (C" C''') to the two ratchet friction drums D D' (D" D''', &c.), around which the cable is wound a sufficient number of times to produce the required friction when the tension device is applied thereto, and the cable is also rove about the tension pulley E (E' E") which is preferably mounted upon a pulley carrying carriage F (F', F") arranged to run upon a suitable track G (G' G").

The tension pulley E (E', &c.,) is connected with suitable yielding means (such as the weight-actuated tension cable H) arranged to draw the float cable B taut; the whole constituting a tension device arranged to pay out and take up the power transmitting cable in response to the action of the float.

I (I' I'') indicates the tension weight.

J indicates the pulley which sustains the tension cable.

K indicates the ratchet of the drum.

L indicates the power shaft on which such drums are mounted.

M indicates the governor actuated brake.

N indicates the governor or brake actuating mechanism and O, P, Q, R, S and S' indicate intermediate means arranged to operatively connect the brake with the power shaft L.

O' indicates the pulley which transmits the power to the machinery.

P indicates a band connecting the pulley shaft with an intermediate shaft.

Q and R indicate sprocket chains connecting the intermediate shaft Q and the pulley shaft L through the medium of the sprocket wheels S and S'.

The tension weights I I', &c., are arranged to be adjustable so that the tension may be increased or decreased as may be desired. Such weights are shown in the drawings as made of a series of plates for this purpose.

In practice each float operates independent of the other floats, rising and falling with the swell of the ocean. When it rises it draws the cable B, and the friction of the cable upon the drum rotates the drums in the direction indicated by the arrow in Fig. 3. Each drum rotates the shaft through the medium of the ratchet K. If the other float of the pair should fall at the same speed that the float A rises the cable will play freely through the tension pulley E without changing the position of the weight I but if the two floats should rise together or should move with a different speed, the loop of the cable which passes around pulley E would be lengthened or shortened. If the loop is shortened the weight will be raised. If the loop is lengthened the weight falls. This device maintains a steady tension of the cable upon the pulleys, such tension being regulated by the means of the weights to produce sufficient friction to drive the machinery at the maximum rate desired but to allow the cables to slip when strain thereupon is in excess of that produced in driving the machinery at the speed desired.

When a sudden rise or fall of the float occurs which would produce a great speed of the machinery the governor N tightens the brake M and checks the rotation of the shaft O and through the intermediate mechanism checks the rotation of the shaft L and the cables are thereby caused to slip upon the drums until the excessive strain has ceased. But in the meantime, in case the pulley shaft L is provided with a series of pairs of drums with their cables and floats as indicated in the drawings, the other floats A'' A''', &c., cause the rotation of the shaft at the speed desired as it is very improbable that all the floats would be operated with too great speed at the same time.

X X indicate the moorings of the floats.

Now, having described my invention, what I claim as new, and desire to secure by Letters Patent, is—

1. The combination set forth of two wave actuated floats; two retaining pulleys arranged to retain cables leading from such floats; a power shaft; two ratchet friction drums mounted upon such shaft both arranged to rotate freely thereon in one direction and to rotate the shaft in the other direction; a suitable tension pulley; yielding means arranged to force the tension pulley away from the shaft, and a driving or power transmitting cable arranged with its intermediate portion rove through the tension pulley and the two members thereof arranged respectively around the two ratchet drums and led thence and rove through the retaining pulleys and led thence to their respective floats and secured to such floats.

2. The combination set forth of two wave actuated floats; two retaining pulleys arranged to retain cables leading from such floats; a power shaft; two ratchet friction drums mounted upon such shaft both arranged to rotate freely thereon in one direction and to rotate the shaft in the other direction; a suitable tension pulley; yielding means arranged to force the tension pulley away from the shaft and a driving or power transmitting cable arranged with its intermediate portion rove through the tension pulley and the two members thereof arranged respectively around the two ratchet drums and led thence and rove through the retaining pulleys and led thence to their respective floats and secured to such floats; a governor and the governor controlled brake connected with the power shaft and arranged to be operated by excessive speed of the shaft to restrain the rotation of the shaft.

RUDOLPH L. JOHANSEN.

Witnesses:
JAMES R. TOWNSEND,
F. M. TOWNSEND.